United States Patent [19]

Rambauske

[11] 4,245,560
[45] Jan. 20, 1981

[54] ANTITANK WEAPON SYSTEM AND ELEMENTS THEREFOR

[75] Inventor: Werner R. Rambauske, Carlisle, Mass.

[73] Assignee: Raytheon Company, Lexington, Mass.

[21] Appl. No.: 302

[22] Filed: Jan. 2, 1979

[51] Int. Cl.³ .............................................. F42C 13/02
[52] U.S. Cl. .................................................... 102/213
[58] Field of Search ................ 102/213, 214; 244/3.16

[56] References Cited

U.S. PATENT DOCUMENTS

| | | | |
|---|---|---|---|
| 2,925,965 | 2/1960 | Pierce | 102/213 |
| 3,202,052 | 8/1965 | Rambauske et al. | 350/153 |
| 3,793,958 | 2/1974 | Holt et al. | 102/213 |
| 4,077,718 | 3/1978 | Graham, Jr. et al. | 356/4 |
| 4,160,415 | 7/1979 | Cole | 102/214 |

Primary Examiner—Charles T. Jordan
Attorney, Agent, or Firm—Philip J. McFarland; Joseph D. Pannone

[57] ABSTRACT

An antitank weapon system is shown to include a projectile carrying at least one pulsed laser radar which periodically illuminates swaths of the underlying terrain, means for processing return signals to distinguish between the radar signatures of objects on such terrain and means for firing submunitions to impact on any object whose radar signature corresponds to that of a tank or other desired target.

1 Claim, 14 Drawing Figures

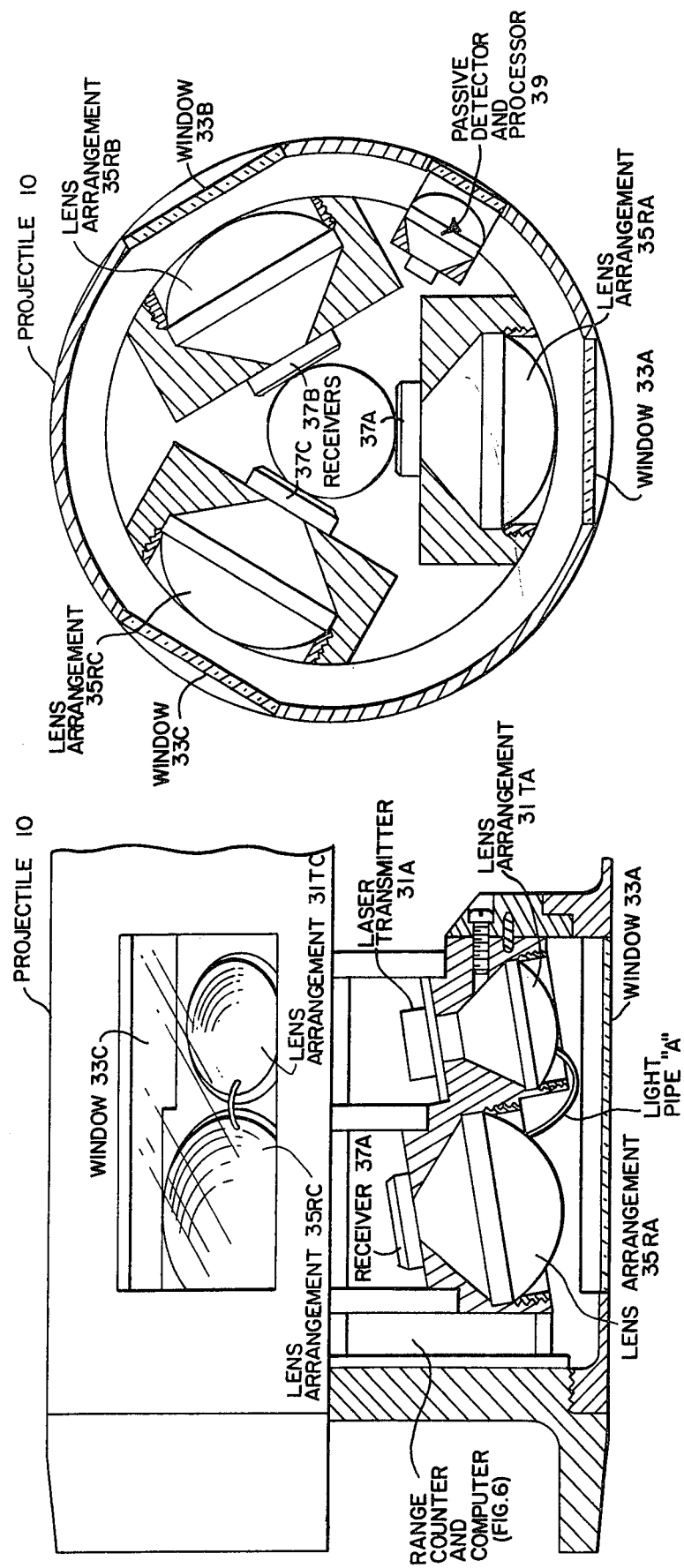

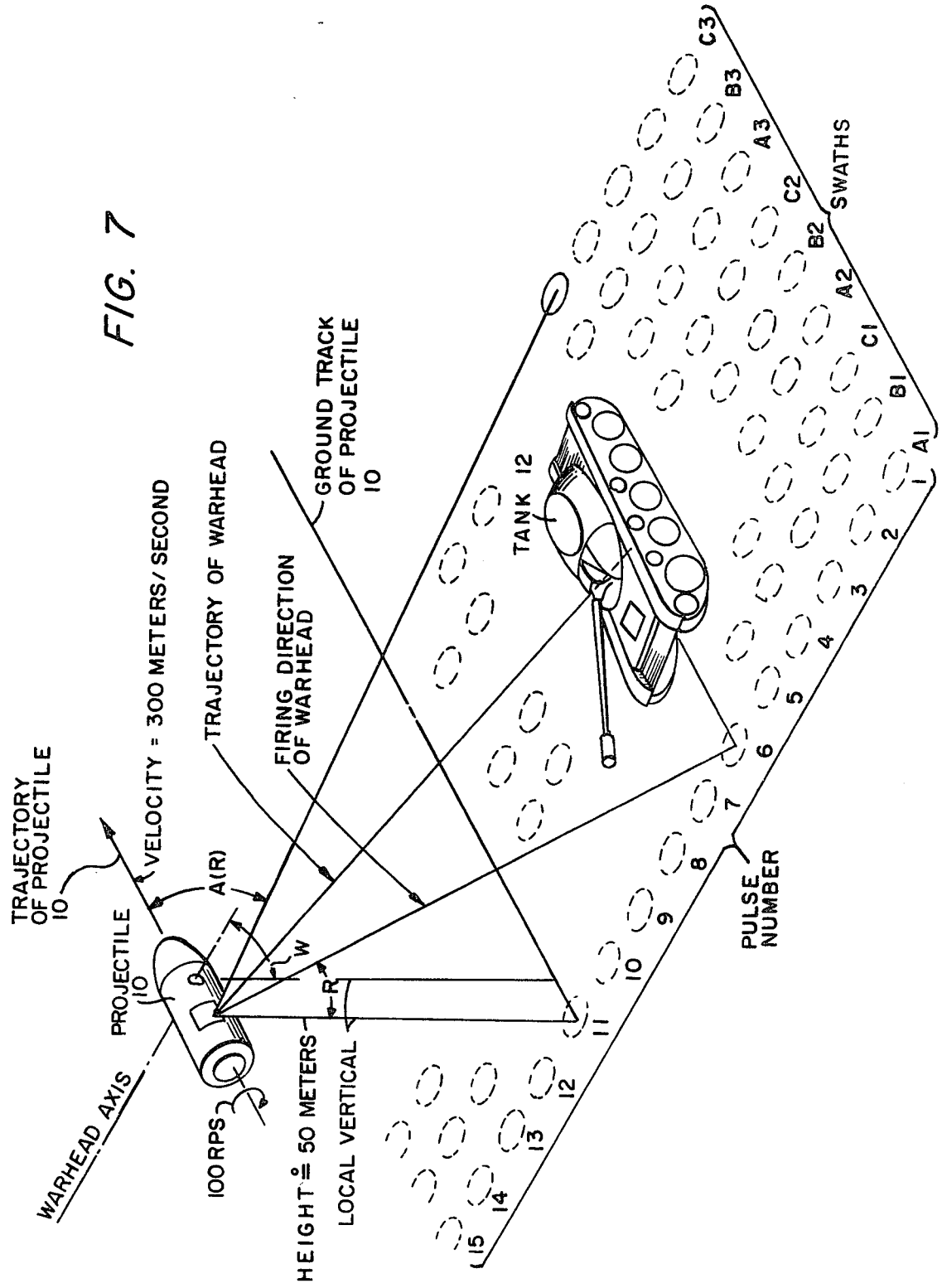

ANTITANK WEAPON SYSTEM AND ELEMENTS THEREFOR

BACKGROUND OF THE INVENTION

This invention pertains generally to weapon systems and particularly to those systems wherein projectiles are used against ground targets.

In the development of systems intended to interdict armored vehicles such as tanks, it has long been recognized that systems using conventional artillery pieces may not be effective in many tactical situations. That is to say, systems using armor piercing shells or projectiles with shaped charges (which must actually impact on tanks to inflict any significant damage) are not as effective as one would wish. Aiming errors, dispersion and, to some extent, the maneuverability of tanks are among the incorrigible errors which combine to reduce the effectiveness of known systems to an undesired level unless barrage, or rapid, fire is carried on in almost all tactical situations. Obviously, however, either one of such firing doctrines would be extremely wasteful of ammunition and would, further, expose friendly forward elements to danger from strays.

Recoilless rifles with rocket-propelled projectiles have been developed in order to increase the effectiveness of anti-tank weaponry. However, if the greatest probability of inflicting lethal damage is to be attained, known rifles of such sort must be fired from short range. This, in turn, means that the personnel manning the recoilless rifle are overly exposed to counterfire.

SUMMARY OF THE INVENTION

With the foregoing in mind, it is a primary object of this invention to provide an improved sensing and control system for submunitions in a projectile, such system being relatively inexpensive to make and having the capability of directing the submunitions in an accurate manner toward a selected target as the projectile approaches such target.

Another object of this invention is to provide a system as above which also is capable of distinguishing between targets of similar shape.

The foregoing and other objects of this invention are generally attained by providing, in a spinning projectile in flight over a terrain, at least one laser radar disposed to illuminate successive swaths of the underlying terrain, processing means responsive to the returns from successively generated sets of such swaths to produce signals representative of the objects on the underlying terrain and to correlate such signals with signals representative of a selected target (as, for instance, a tank), heat sensing means to determine whether or not the selected target is operational and means for discharging submunitions from the spinning projectile toward the selected target, if operational, when such projectile is approximately in a vertical plane through the selected target and orthogonal to the trajectory of such projectile.

BRIEF DESCRIPTION OF THE DRAWINGS

For a more complete understanding of this invention reference is now made to the following description of a preferred embodiment of this invention as shown in the accompanying drawings, wherein:

FIGS. 4A and 4B, taken together, illustrate a layout of the optical elements of laser radars according to one embodiment of this invention;

FIG. 7 is an enlargement of the area around the selected target with the scanning pattern of the contemplated system superposed on such area.

DESCRIPTION OF THE PREFERRED EMBODIMENT

Figure 1:
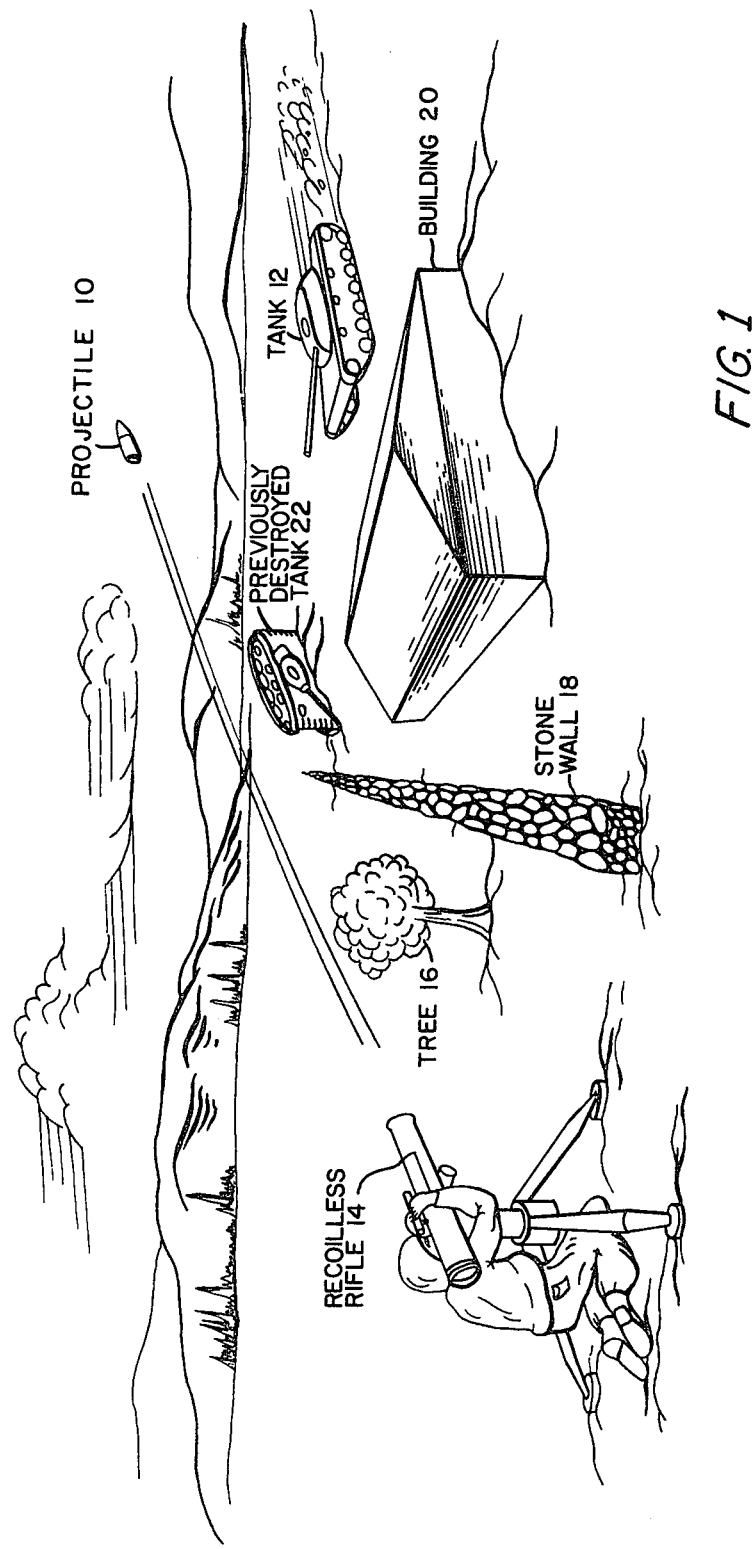
FIG. 1 is a sketch of an exemplary tactical situation wherein a selected target, here a tank, is in a wooded area.

Referring now to FIG. 1, an exemplary tactical situation is shown wherein a gunner has caused a projectile 10 to have been fired from a recoilless rifle 14 toward a tank 12. A conventional rangefinder and aiming arrangement (not shown) is used to control the elevation angle of the recoilless rifle 14 so that the projectile passes over a tree 16 and a stone wall 18 past a building 20 and a previously destroyed tank 22 to a point above the tank 12.

Figure 2A:
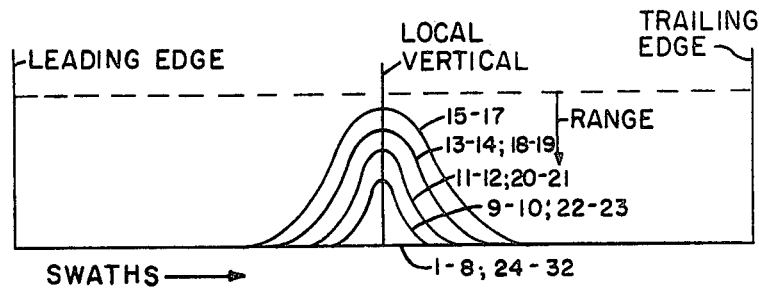
FIGS. 2A through 2D are sketches to illustrate how return signals from different types of targets appear.
Figure 2B:
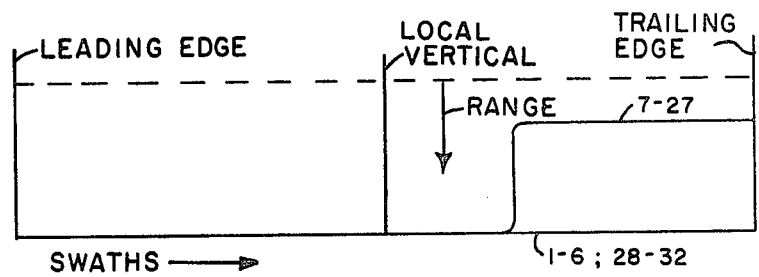
Figure 2C:
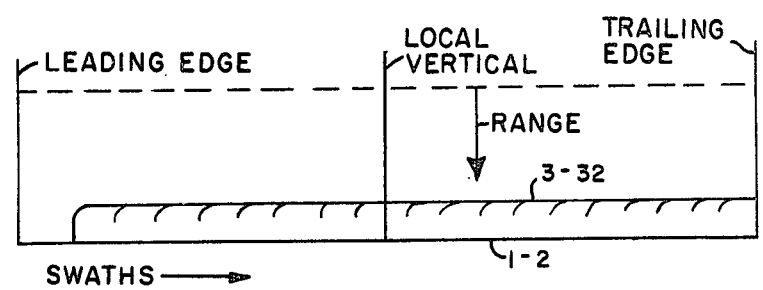
Figure 2D:
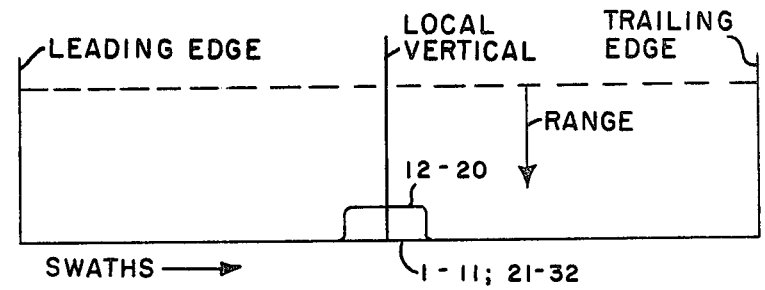

The detection and control arrangement in the projectile 10 will be described in more detail hereinafter; suffice it to say here that that arrangement includes a plurality (here three in number) of pulsed laser radars arranged successively to scan swaths of the terrain forward of the projectile 10 during its flight. The radar "signature" of such terrain and of any illuminated objects are shown in FIGS. 2A through 2D, wherein it is assumed that 32 successive swaths will encompass any target of interest. Thus, in FIGS. 2A through 2D, the abscissas are defined by the leading and trailing edges of each swath, or scan, (numbered 1 through 32) and the ordinates are range (measured from the projectile 10 in flight). FIG. 2A is indicative of the radar signature of an object such as the tree 16 (FIG. 1); FIG. 2B is indicative of the radar signature of an object such as the building 20; FIG. 2C of the stone wall 18; and FIG. 2D of the tank 12 or of the previously destroyed tank 22. It will be observed that sensible differences exist between the various types of targets, except between the tank and the previously destroyed tank 22 (FIG. 1). Specifically, the radar signature of the tree 16 is characterized by "soft" edges of the return on each scan and the changes in range from scan to scan while the radar signatures of the illustrated man-made objects are characterized by abrupt changes in range and little, if any, change in range from scan to scan.

It will be recognized that, although details of the radar signature of any object may vary with factors such as pulse repetition frequency of the lasar radar, spin rate of the projectile 10 (FIG. 1), and shape, aspect or range of the object, significant distinguishing features of the desired target (tank 12, FIG. 1) will always be observed. That is to say, even though vegetation, buildings, walls and the like may change, the dimensions of a particular type of tank will remain constant. With a given velocity and spin rate for the projectile 10 (FIG. 1) and pulse repetition frequency, the following characteristics of the returns from a tank of a given type are here of interest:

1. During any scan when the tank is first illuminated the measured range decreases abruptly by a known amount (say 1 meter) and then similarly increases;
2. The number of returns from a tank during each scan varies, depending upon aspect angle and range, up to the number of returns possible from a target of given length (say 6 meters); and
3. The total number of returns from a tank is dependent upon the range to the tank and the area of the tank.

It will now be noted that returns from the previously destroyed tank 22 (FIG. 1) most probably would be indistinguishable from returns from the tank 12. To avoid confusion, then, an infrared detector (FIGS. 4A and 4B) is installed in the projectile 10 (FIG. 1). Such detector, then is effective to produce a signal indicative of the tank 12 because that tank alone would have its motor going to generate detectable heat.

Figure 5:
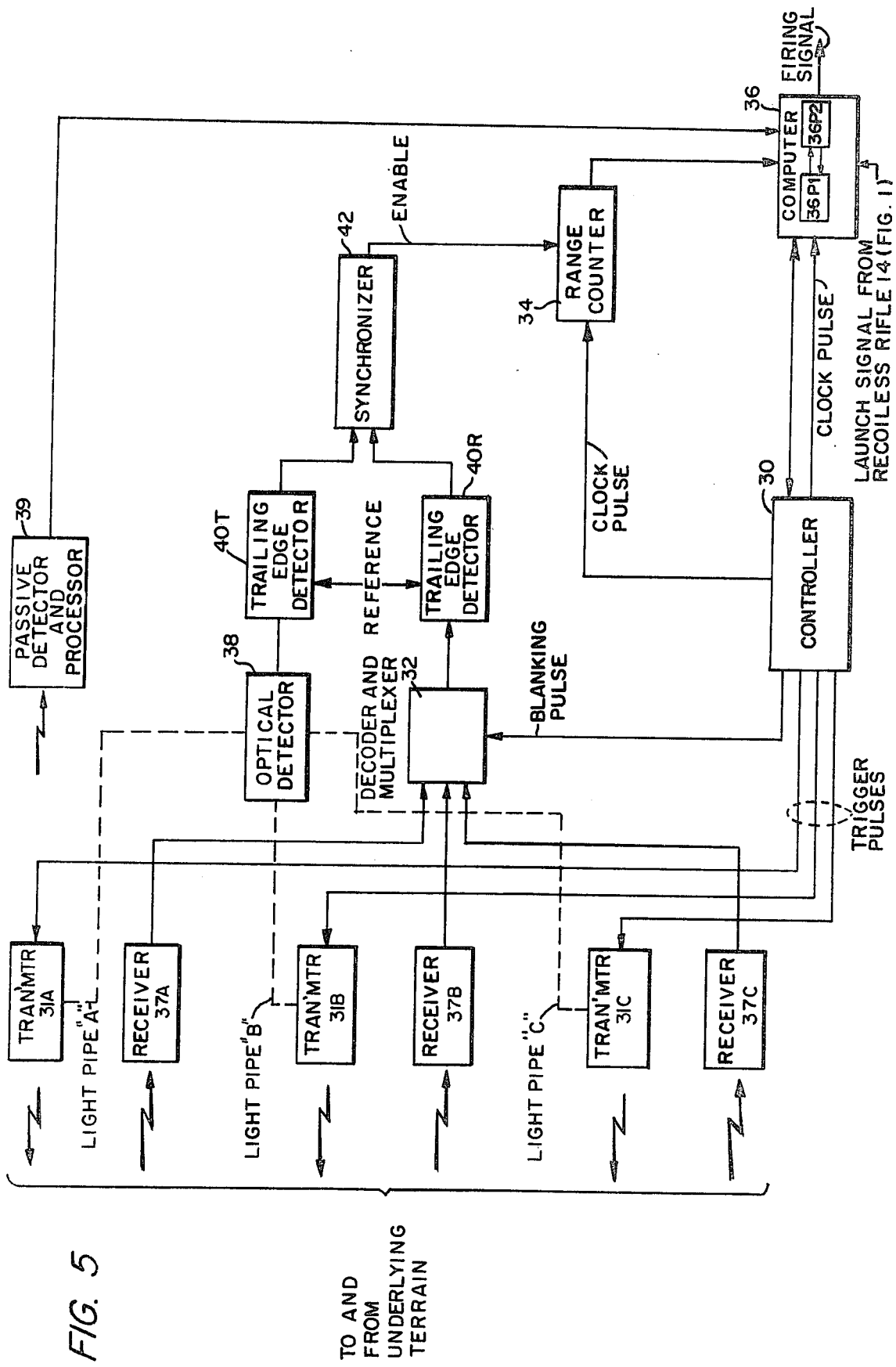
FIG. 5 is a simplified block diagram of the laser radar and controller illustrated in FIGS. 4A and 4B.

It will be appreciated that a signal processor such as that shown in FIG. 5 installed in the projectile 10 (FIG. 1) may be arranged to respond to the returns to the optical radar and the infrared sensor and to produce a "target present" signal only when an operating tank, i.e. tank 12 is illuminated.

It will also be appreciated that, at a moment shortly after a desired target has been detected and identified, the submunitions carried by the projectile 10 must be discharged to impact on such target. At the particular moment required for successful discharge, the squinted laser radar beam (or beams) may not illuminate the selected target; therefore, the line of sight of any such beam cannot be directly used as an aiming reference line.

It is contemplated, therefore, that a reference line substantially coincident with the local vertical through the projectile 10 (FIG. 1) in flight be determined so that, wherever a selected target may be within the field scanned by the laser radars, the submunitions may be discharged at the proper moment by referencing both target and submunitions to said reference line. The selection of such a reference line (hereinafter referred to as the local vertical) has added advantages: (1) It serves as a marker to control the operation of the laser radars so that each one operates only when pointed toward the underlying terrain; and (2), by allowing substantially equal azimuth aiming errors (left and right errors) of the projectile 10 (FIG. 1), the maximum error magnitude is minimized.

Figure 3A:
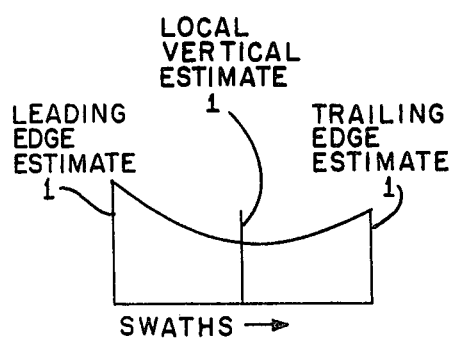
FIGS. 3A and 3B are diagrams showing how the position of the local vertical through a spinning projectile may be determined from range measurements.
Figure 3B:
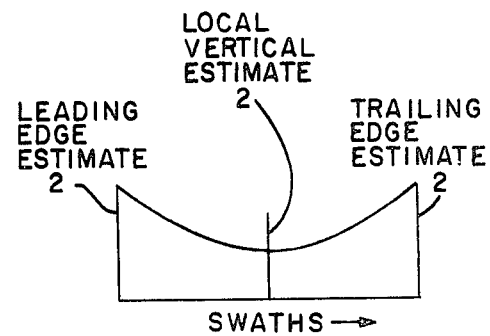

To determine the local vertical in flight, one of the laser radars is actuated for one revolution of the projectile 10 (FIG. 1) before that projectile reaches the point in its trajectory at which search for a target is to be initiated. As the beam from the actuated laser radar is scanned, the transmitted beam sweeps toward the sky and across a swath on the terrain. Returns are, of course, detected then which are representative of the contour of the terrain, with the shortest indicated range corresponding to returns in the vertical plane. The next following laser radar then is actuated to emit a first short burst when its beam points at the estimated position of the leading edge of the swath and a second short burst when its beam points at the estimated position of the trailing edge of such swath. As indicated in FIG. 3, if the measured ranges to such points differ, an incorrect estimate of the position of the local vertical is indicated so more adjustment is required. Therefore, adjustment of the times at which the next following laser radar is actuated is effected until, again as shown in FIG. 3 by the points "A" and "B", the measured ranges to the beginning and end of each swath are equal. Even though the terrain may slope from the beginning and ending of the swaths, the procedure for equalization of ranges results in the establishment of a reference which substantially corresponds with the local vertical. In any event, the reference will be close enough to the local vertical to cause the ground track of the projectile 10 (FIG. 1) to be centered, for any practical purpose, on the illuminated swaths. With the spin rate of the projectile 10 known, the intervals during which the laser radars should be operated to illuminate successive swaths is calculable. Here, where the spin rate is 100 r.p.s., the laser radars are sequentially actuated for 2.5 milliseconds at $3\frac{1}{3}$ millisecond intervals.

It will now be noted in passing that the number of laser radars in the projectile 10 (FIG. 1) for a given resolution (assuming a beamwidth of, say, 1°) is determined by the velocity and the spin rate of such projectile. Thus, assuming a velocity of 300 meters per second and a spin rate of 100 revolutions per second, it may readily be calculated that three laser radars are required to attain a resolution of one meter in the direction of the velocity vector of the projectile 10 (FIG. 1). Similarly, it will be noted that resolution (with the projectile 10 (FIG. 1) at a given altitude) along each swath is determined by the pulse repetition interval (PRI) of each laser radar. Thus, assuming an altitude of fifty meters for such projectile, a PRI equal to 1/30.5 KHz provides a resolution of one meter. With resolutions of one meter "along-course" and "cross-course" the radar signatures of various types of objects are as illustrated in FIGS. 2A-2D. It will also be appreciated that each laser radar must scan a swath ahead of the projectile 10 (FIG. 1) in order to provide a lead time in which: (a) a selected target may be identified, (b) the projectile may be rotated into the proper angle with respect to the local vertical to allow the submunitions to be fired toward the target. The proper lead is (neglecting target motion because the greatest such motion is infinitesimal compared with the velocities of the projectile (300 meters per second) and of the submunitions (3000 meters per second)) dependent upon the range from the projectile 10 (FIG. 1) to the target. To accomplish the purpose, the centerline of the field of fire of the submunitions is fixed so that such centerline will pass through the tank 12 when the range is a maximum (50 meters). When the range is short (less than, say, 20 meters), the third criterion mentioned above for identifying a tank is not followed to its completion. That is, if the characteristic changes in range during successive scans have been experienced and if the number of returns during at least two successive scans are within limits, a tank is assumed to have been identified even though the total number of returns is less than the number from a tank.

Referring now to FIGS. 4A and 4B, it may be seen that each laser radar comprises a transmitter section (not numbered) with only laser transmitter 31A, being in view, each here using a gallium arsenide laser (operating at 0.9 microns) to emit a beam (when pulsed) through an appropriate lens arrangement such as lens arrangements 31TA, 31TC and a window 33A, 33B, 33C. Each such beam is approximately 1° in width and is squinted forward by approximately 10° from the perpendicular to the axis of the projectile 10. A corresponding lens arrangement 35RA, 35RB, 35RC is aligned with each one of the lens arrangements used with the laser transmitters (such as lens arrangements 31TA, 31TC) behind each window 33A, 33B, 33C. A light pipe (such as that designated light pipe "A") is disposed between pairs of transmitting and receiving lens arrangements. A corresponding receiver 37A, 37B, 37C is mounted behind each lens arrangement 35RA, 35RB, 35RC. A range counter and computer (FIG. 5) are mounted on a bulkhead (not numbered) within the projectile 10. A single passive detector and processor 39 to detect infrared radiations is mounted as shown between any pair of laser radars. Finally, ancillary, but necessary, elements (such as batteries, not shown) are mounted within the projectile 10 in any convenient manner.

Referring now to FIG. 5 it may be seen that the elements making up the laser radars and the processor shown in FIGS. 4A and 4B are actuated in response to signals from a controller 30. That element is conventional, containing a clock pulse generator (not shown) and appropriate dividers and logic circuitry to produce trigger pulses for the transmitters 31A, 31B and 31C and control pulses for a decoder and multiplexer 32 as well as trigger pulses for a range counter 34 and a computer 36. A "launch signal", generated in any convenient manner when the projectile 10 (FIG. 1) is launched, occurs to start operation and to designate the criteria to be used for identification of targets. The controller 30 then is operative to supply trigger pulses to one of the transmitters, say transmitter "31A", during an interval corresponding to the period of rotation of the projectile 10 (FIG. 1), blanking pulses (to inhibit feedthrough of each transmitter pulse) and clock pulses to the range counter 34 and to the computer 36. With a repetition rate of about 30 KHz for the trigger pulses and a spin rate of 100 revolutions per second for the projectile 10 (FIG. 1), when the beam from the transmitter 31A is pointed toward the underlying terrain, returns from points about one meter apart actuate receiver 37A. The transmitters 37A, 37B and 37C, as well as the receivers 37A, 37B and 37C, may be similar to the laser radar shown in U.S. Pat. No. 4,077,718. Thus, the requisite detectors in the receivers 37A, 37B and 37C are avalanche diodes with compensation means to maintain the sensitivity of such diodes at an optimum even though the ambient temperature may change materially. A sample of each transmitted pulse is conducted through a light pipe (here labeled light pipes "A", "B", and "C") to a conventional optical detector 38 to produce an electrical pulse marking the instant at which transmission occurs. That pulse is passed to a trailing edge detector 40T (described hereinafter) which produces an indication when the amplitude of the trailing edge of each electrical pulse equals one-half the amplitude of the pulse. The indication, in turn, causes a synchronizer (labeled synchronizer 42) to be "set", thereby producing an enable signal for a counter (range counter 34). In consequence, clock pulses thereafter sent to the range counter 34 are counted.

Whenever a returned pulse is detected by receiver "37A", an electrical pulse is passed therefrom (through the decoder and multiplexer 32 which is enabled to allow only a returned pulse from the receiver in operation to be passed) to a trailing edge detector 40R (which is similar to the trailing edge detector 40T). The indication out of the trailing edge detector 40R causes the synchronizer 42 to be "reset" with the result that the enable signal is removed from the range counter 34. The then present contents of the range counter 34 are a measurement of range. It will be appreciated that the minimum range is measured when the transmitted laser beam coincides with the local vertical and that when such beam leads or lags the local vertical by the same amount (say 45°) the measured ranges are substantially equal.

The computer 36 here comprises a pair (each here a Zilog Z80A) of microprocessors 36p1, 36p2 with associated program and data memories (not shown). The first of the microprocessors 36p1 is used for range comparison meaning that it accepts the count in the range counter 34 and, in the synchronizing mode being discussed, compares the first and the last outputs of that counter. If those outputs differ, the trigger pulses out of the controller 30 are delayed (or advanced, if required) until equality is achieved. The swath then illuminated by each laser then extends 45° to either side of the local vertical.

Once the local vertical is determined the first microprocessor 36p1 is operative to compare, during each swath, the outputs of the range counter 34 at similar angles with respect to the local vertical, and to mark those which change by a given range increment (say one to four meters). The marked outputs of the range counter 34 (referred to hereinafter as "strings") are passed to the second microprocessor 36p2. Processor 36p2 is programmed to accept the strings from processor 36p1 and to produce the firing signal for the submunitions when signals such as those shown in FIG. 2D have been received along with a positive signal from the passive sensor. To accomplish such end, processor 36p2 is programmed to compare the marked strings with strings stored in a read-only memory which are representative of a desired target, i.e. tank 12 (FIG. 1). If the comparison shows that the marked strings correspond with possible strings from a desired target, the position of the target relative to the projectile 10 (FIG. 1) is determined as shown in FIG. 7.

Referring back now to the details of the trailing edge detectors 40T, 40R, it will first be observed that, although the dynamic range of signals into the former may be rather small, the amplitude of signals into the latter may vary within very wide limits (say 80 dB). In addition, although the shapes of the transmitted pulses may be deemed to be the same, the shapes of the received pulses differ in accordance with the character of the different areas illuminated by the transmitted pulses. In consequence, the use of a conventional detection scheme (wherein means are provided to determine when the trailing edge of a pulse is equal to a reference signal) is almost impossible to implement in a satisfactory manner. That is to say, conventional trailing edge detectors cannot here be used to indicate the time interval between the transmission of an interrogating pulse and reception of an echo pulse.

Figure 6:
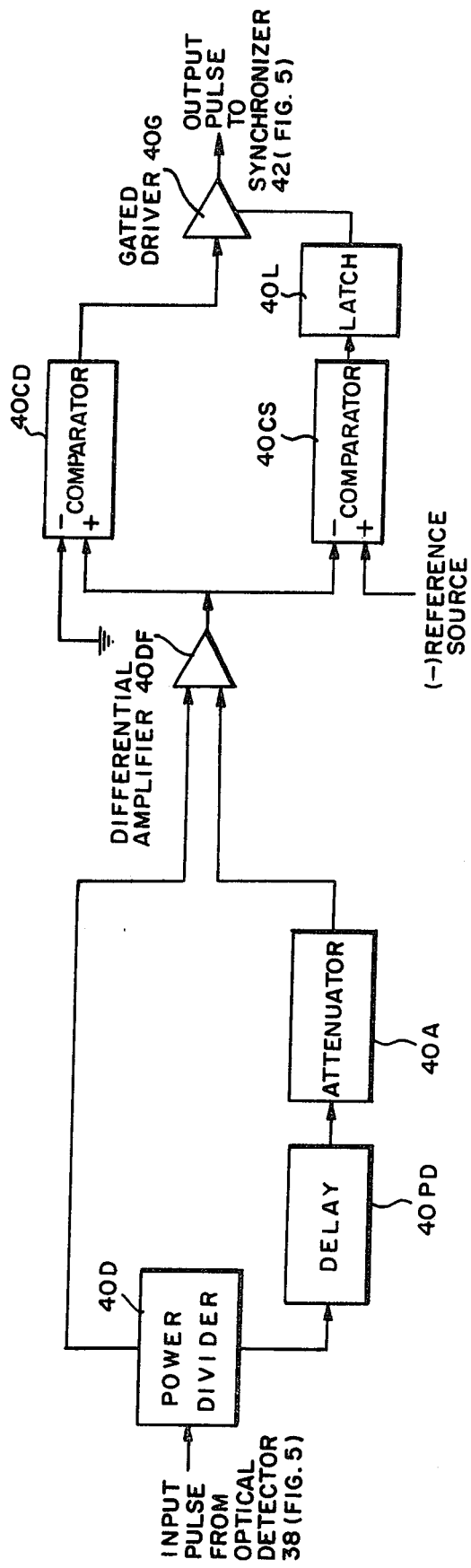
FIG. 6 is a simplified block diagram of a trailing edge detector used in FIG. 5.

With the foregoing in mind, it will be observed that the trailing edge detectors 40T, 40R are operative, regardless of the amplitude of any particular pulse being processed, to provide an indication when the amplitude of the trailing edge of such pulse equals one-half the peak amplitude. Thus, as shown in FIG. 6, each pulse into the trailing edge detector 40T is split in a power divider 40D of conventional construction into two paths. As is well known, the signal out of one output port of such a divider is in phase with the input signal (such port sometimes being referred to as the noninverting port) and the signal out of the second port is also in phase with the input signal (such port sometimes being referred to as the inverting port). That is to say, here the signals in the two paths out of the power divider 40D are, relatively speaking, in phase. The signal in the upper path is passed directly to the inverting input terminal of a differential amplifier 40DF while the signal in the lower path is passed successively through a delay network 40PD and an attenuator 40A to a noninverting input terminal of the differential amplifier 40DF. It will now be appreciated that, with the trailing edge of the transmitted pulse known a priori, the delay network 40PD may be designed so that the peak of any return signal in the lower path straddles the trailing edge of that return signal in the upper path. It will also be appreciated that, depending on the amount of attenuation suffered by the signal in the lower path (meaning the attenuation provided by the attenuator 40A) and the shape of the trailing edge of any return signal in the upper path, the input signals to the differential amplifier 40DF will be equal at some moment in time. Before that moment (when a return signal is being received) the inverted signal in the upper path will always have the greater amplitude and after that moment the lesser. In consequence, then, the output of the differential amplifier 40DF is a pulse having a leading negative portion and a trailing positive portion, with the transition from negative to positive occurring when the input signals to that amplifier are equal in amplitude but opposite in phase internally.

The output of the differential amplifier 40DF is connected as shown to the positive input terminal of a comparator 40CD and to the negative input terminal of a comparator 40CS. The negative input terminal of the former is grounded and the positive input terminal of the latter is connected to a negative reference source. The output of the comparator 40CD is connected to the input terminal of a gated driver 40G. The output of the comparator 40CS is connected through a latch circuit 40L to the gate terminal of the gated driver 40G.

The comparator 40CS and latch circuit 40L are operative to enable the gated driver 40G only when the amplitude of the leading portion of the signal out of the differential amplifier 40DF exceeds a predetermined level. That is to say, only signals (deemed to be valid return signals) which exceed a predetermined threshold may cause the gated driver 40DF to become operative.

Referring now to FIG. 7, the dotted elliptical shapes indicate previously illuminated areas numbered for each successive lettered swath and the solid elliptical shape indicates the particular area being illuminated at the given moment in time when the submunitions (not shown) are to be fired. It will be appreciated that the illuminated areas making up each swath do not lie on a line precisely orthogonal to the ground track of the projectile 10 as shown, but rather lie on the projection of a helix on the underlying terrain. However, because the differences between illustration and actuality are immaterial to an understanding of the FIGURE, the simpler drawing approach has here been taken to show that the position of an identified object (here tank 12) relative to the projectile 10 may be taken to be the centroid of a number of strings of returns from successive swaths. The forward squint angle (angle A(R)) of the beams and the altitude establishes the distance from the swath being currently illuminated back to the local vertical which is also known to be centered on each swath. Thus, when the projectile 10 is above the previously illuminated area A1-11, the laser beam is at illuminated area C3-5 and the centroid of the target is at the previously illuminated area B2-6. The angle between the plane containing the local vertical and the plane through the target centroid thus is known and is shown as angle "R".

The submunitions carried in the projectile 10 here are contemplated to be high velocity projectiles (sometimes referred to hereinafter as the "warheads"). Such warheads are mounted in the projectile 10 so that their common axes, i.e. the firing direction of each warhead, are perpendicular to the longitudinal axis of the projectile 10. Further, the warheads are oppositely disposed so that the projectile 10 need rotate only through 180° to bring one or the other into a firing position. That is to say, the axis of the pair of warheads will make the angle "R" with the local vertical twice during each rotational period of the projectile 10.

The trajectory of the warhead is (neglecting the effects of gravity and friction) determined in part by the velocity of the projectile 10 and in part by the initial velocity imparted to the warhead by firing. The ratio of the magnitudes of such velocities determines the difference between the firing direction of the warhead and the trajectory of the warhead. Here such ratio is about 1:10, making it necessary here to fire the warhead before the tank 12 is abeam the projectile 10.

In FIG. 7 the warhead axis is shown making angle "W" with the local vertical. The angular position of the warhead axis with respect to each of the laser radars (here three) is known and since each laser radar must be operated symmetrically disposed about the local vertical, the position of the warhead axis with respect to the local vertical is readily determined. Then, when the projectile has rotated so that the warhead axis lies in the plane containing the target centroid (angle "W" is equal to angle "R") and the warhead trajectory passes through the target centroid, the warhead is fired.

Figure 8A:
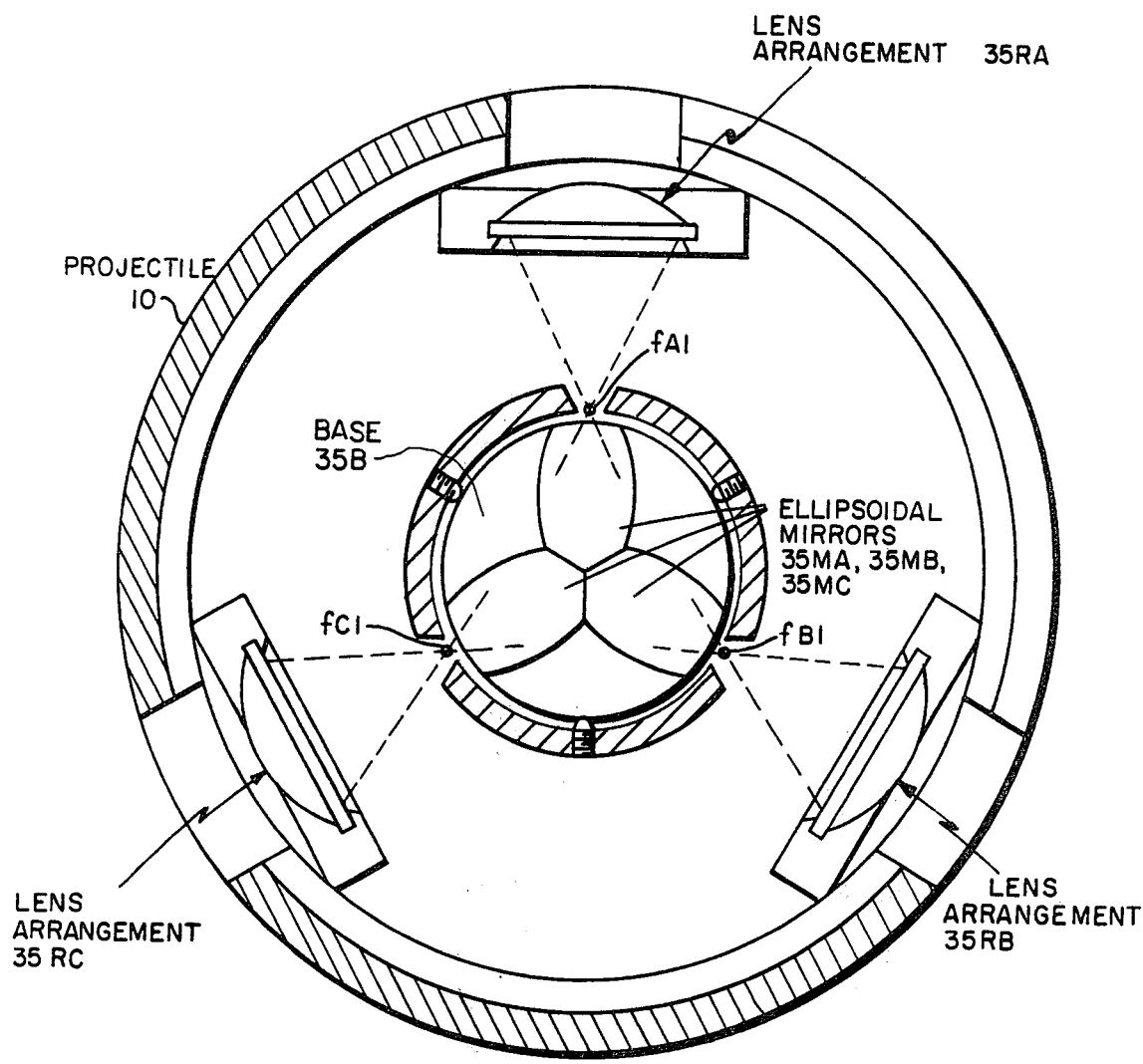
FIGS. 8A and 8B together illustrate an alternative arrangement of the optical elements of laser radars shown in FIG. 5.
Figure 8B:
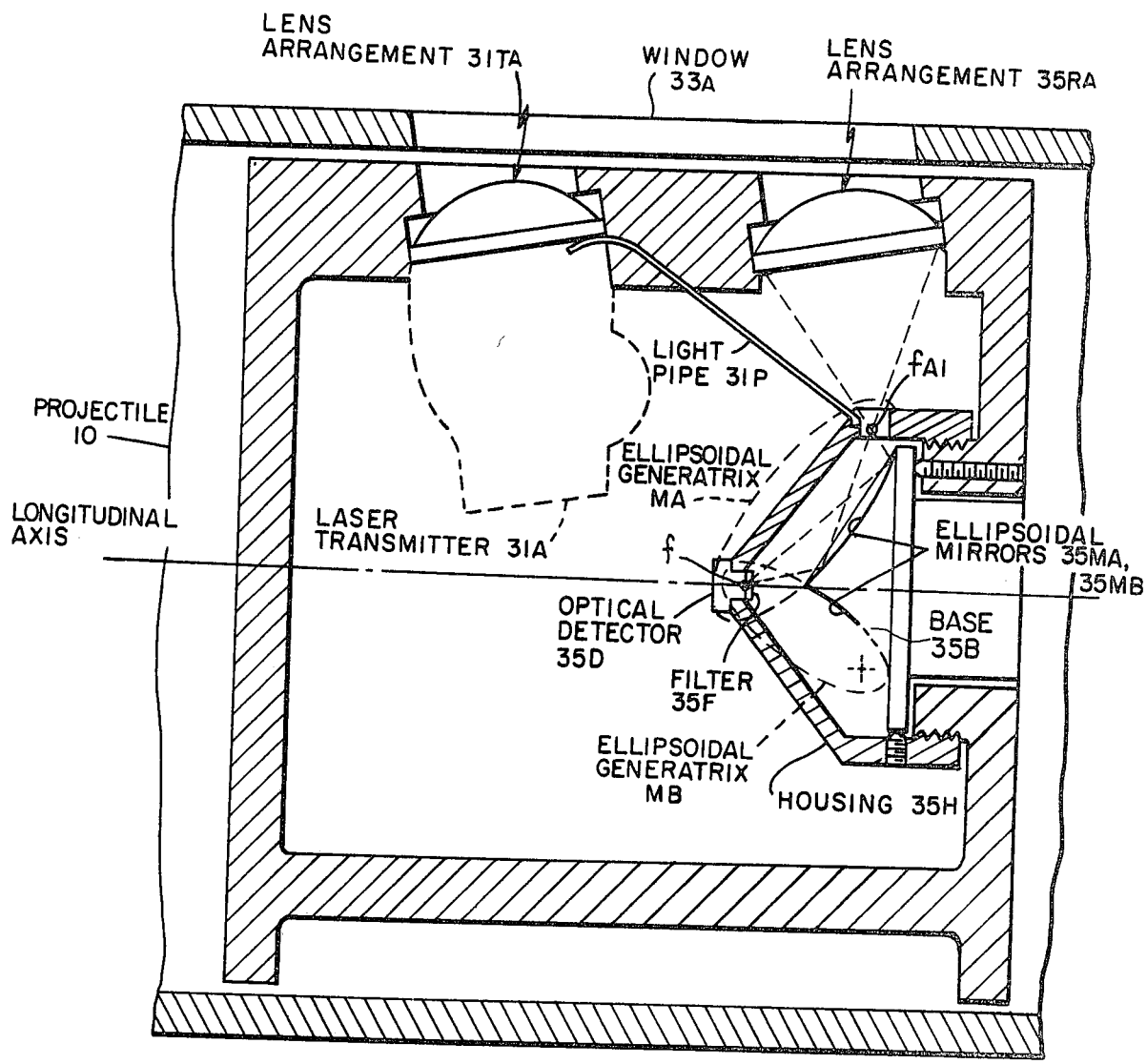

Before referring to FIGS. 8A and 8B in detail, it will be recalled that a separate optical detector is disposed in the focal plane of each one of the three lens arrangements 31TA, 31TB, 31TC. It will be appreciated by one of skill in the art that, in theory at least, plane mirrors or prisms could have been used to have the three focal planes coincide. However, in the particular application here contemplated such an approach is not practical in view of the fact that each lens arrangement 31TA, 31TB, 31TC must have a short focal length, with the result that the requisite plane mirrors or prisms may not be made small enough for the available image space.

Referring now to FIGS. 8A and 8B, it may be seen that the laser transmitters 31A, 31B, 31C, the lens arrangements 31TA, 31TB, 31TC, windows 33A, 33B, 33C and lens arrangements 35RA, 35RB, 35RC are similar in purpose and construction to the correspondingly numbered elements in FIGS. 4A and 4B. A description of such elements will not, therefore, be repeated. With the foregoing in mind, it will now be observed that a light pipe, such as light pipe 31P (FIG. 8B), is disposed so that a portion of each transmitted laser beam is passed through a corresponding focal point of each one of the lens arrangements 35RA, 35RB, 35RC. Each different one of such focal points is also a focal point of an ellipsoidal mirror 35MA, 35MB, 35MC. The second focal point of the ellipsoidal mirrors 35MA, 35MB, 35MC is a common point (marked "f")

located on the longitudinal axis of the projectile 10. Two of the ellipsoidal generatrices (MA, MB) are shown in FIG. 8B. Preferably the ellipsoidal mirrors 35MA, 35MB and 35MC are replicas formed in any convenient way on the surface of a base 35B by a master having three convex surfaces corresponding to the desired ellipsoidal shapes. The base 35B is adjustably mounted, as shown, within a housing 35H so that the focal points of the ellipsoidal mirrors 35MA, 35MB, 35MC may be properly positioned. A filter 35F is mounted in any convenient manner in the path of energy passing to an optical detector 35D (here an avalanche diode photodetector). The filter 35F is chosen to pass the frequency of the laser energy from the laser transmitters 31A, 31B, 31C and to reject all other frequencies. The output of the optical detector 35D is connected to a receiver (not shown) but generally similar to that shown in FIG. 5.

It will now be appreciated that, as each one of the laser transmitters 31A, 31B, 31C is actuated to illuminate a swath on the underlying terrain, a portion of the transmitted laser energy is passed through one of the focal points fA1, fB1, fC1 to be reflected off one of the ellipsoidal mirrors 35MA, 35MB, 35MC toward the focal point f. Such reflected energy then is passed through the filter 35F to the optical detector 35D, thereby starting the range measuring process. When a return signal is received, energy is passed through a given one of the focal points fA1, fB1, fC1 and then is reflected from the corresponding one of the ellipsoidal mirrors 35MA, 35MB, 35MC to be directed through the filter 35F to the optical detector 35D to complete the range measuring process.

It will also be appreciated that the just described arrangement is relatively insensitive to energy other than the laser energy. Firstly, the housing 35H is effective to screen out all energy except that which is passed through the openings (not numbered) near the focal points fA1, fB1, fC1 and is reflected from the ellipsoidal mirrors 35MA, 35MB, 35MC. Secondly, the filter 35F is effective to prevent energy having a substantially different frequency from actuating the optical detector 35D. As a result, then, sunlight or energy from flares has little, if any, effect, and, additionally, the detector 35D is thermally insulated. Also, because a single optical detector is used, alignment problems attendant upon the use of a number of optical detectors are eliminated. That is to say, differences in sensitivity between seemingly identical optical detectors are not experienced. Still further, the effects of centrifugal force during flight are minimized when a single detector is mounted on the longitudinal axis of the projectile 10. Finally, and probably most important, the use of ellipsoidal mirrors allows the focal length of each one of the lens arrangements 35RA, 35RB, 35RC to be short to allow for best operation of the laser radars and at the same time provides a way in which the focal planes of such arrangements may be transferred to a common plane. With respect to the filter 35F, it will be appreciated that an interferometer using a piezoelectric crystal, as shown in Rambauske et al, U.S. Pat. No. 3,202,052, could be substituted to allow the dynamic range of the light intensity to be extended.

Having described a preferred and alternative embodiments of this invention, it will be apparent to one of skill in the art that many changes and modifications may be made without departing from the inventive concepts. Thus, for example, if dynamic range were a problem, the differential amplifier 40DF (FIG. 6) could be replaced by a so-called "out-of-phase" power combiner. It is felt, therefore, that coverage should not be limited to the disclosed embodiments, but rather should be limited only by the spirit and scope of the appended claims.

I claim:

1. In an antitank weapon system wherein a laser radar is installed in a spinning projectile to scan the terrain underlying such projectile in flight, the arrangement comprising:
   (a) a plurality of laser transmitters for illuminating a like plurality of swaths of the underlying terrain during each period of rotation of the spinning projectile;
   (b) a like plurality of focusing lenses, each different one of such lenses having substantially the same field of view as a corresponding one of the laser transmitters, successively to focus return signals at focal points lying on a circle orthogonal to the longitudinal axis of the spinning projectile and centered on such axis;
   (c) an optical detector mounted on the longitudinal axis of the spinning projectile; and
   (d) a plurality, corresponding in number to the plurality of focusing lenses, of mirrors having concave ellipsoidal reflecting surfaces disposed within the spinning projectile, each different one of such surfaces having a common focal point at the optical detector and a second focal point coincident with a different one of the focal points of the focusing lenses.

* * * * *